United States Patent
Byun et al.

(10) Patent No.: US 10,849,031 B2
(45) Date of Patent: Nov. 24, 2020

(54) METHOD AND APPARATUS FOR PERFORMING V2X COMMUNICATION

(71) Applicant: LG ELECTRONICS INC., Seoul (KR)

(72) Inventors: Daewook Byun, Seoul (KR); Jian Xu, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 50 days.

(21) Appl. No.: 16/075,884

(22) PCT Filed: Feb. 3, 2017

(86) PCT No.: PCT/KR2017/001202
§ 371 (c)(1),
(2) Date: Aug. 6, 2018

(87) PCT Pub. No.: WO2017/135740
PCT Pub. Date: Aug. 10, 2017

(65) Prior Publication Data
US 2019/0045405 A1   Feb. 7, 2019

Related U.S. Application Data

(60) Provisional application No. 62/292,242, filed on Feb. 6, 2016.

(51) Int. Cl.
*H04W 36/00* (2009.01)
*H04W 24/10* (2009.01)
(Continued)

(52) U.S. Cl.
CPC ......... *H04W 36/0072* (2013.01); *H04W 4/46* (2018.02); *H04W 4/70* (2018.02);
(Continued)

(58) Field of Classification Search
CPC ......... H04W 36/0072; H04W 36/0066; H04W 36/14; H04W 24/10; H04W 48/18;
(Continued)

(56) References Cited

U.S. PATENT DOCUMENTS

2017/0188391 A1 * 6/2017 Rajagopal ......... H04W 74/0816
2018/0115930 A1 * 4/2018 Belleschi .......... H04W 36/0072
(Continued)

FOREIGN PATENT DOCUMENTS

WO   2015004142 A1   1/2015
WO   2015/111894 A1   7/2015

OTHER PUBLICATIONS

RAN WG1, "LS on resource allocation principles in PC5-based V2V", R2-156012, 3GPP TSG RAN WG2 Meeting #92, Anaheim, USA, Nov. 16-20, 2015, see section 1.
(Continued)

*Primary Examiner* — Walli Z Butt
(74) *Attorney, Agent, or Firm* — Dentons US LLP

(57) ABSTRACT

Provided are a method for performing vehicle to everything (V2X) communication by a base station in a wireless communication system, and an apparatus for supporting the same. The base station receives resource information, which is used by a neighbor base station for V2X communication, from the neighbor base station, and determines whether to perform one of PC5 handover and Uu handover with respect to a terminal on the basis of the resource information used for V2X communication, wherein the resource information that the neighbor base station uses for V2X communication includes at least one of PC5 resource information and Uu resource information, which is used by the neighbor base station for V2X communication, and the PC5 handover may be performed using a PC5 resource of the neighbor base
(Continued)

station and the Uu handover may be performed using a Uu resource of the neighbor base station.

7 Claims, 11 Drawing Sheets

(51) Int. Cl.
| | |
|---|---|
| *H04W 48/18* | (2009.01) |
| *H04W 36/24* | (2009.01) |
| *H04W 4/46* | (2018.01) |
| *H04W 4/70* | (2018.01) |
| *H04W 36/14* | (2009.01) |
| *H04W 4/90* | (2018.01) |
| *H04W 4/40* | (2018.01) |

(52) U.S. Cl.
CPC ....... *H04W 24/10* (2013.01); *H04W 36/0066* (2013.01); *H04W 36/14* (2013.01); *H04W 36/24* (2013.01); *H04W 48/18* (2013.01); *H04W 4/40* (2018.02); *H04W 4/90* (2018.02)

(58) Field of Classification Search
CPC ......... H04W 4/40; H04W 36/24; H04W 4/46; H04W 4/70; H04W 4/90
See application file for complete search history.

(56) References Cited

U.S. PATENT DOCUMENTS

| | | | |
|---|---|---|---|
| 2018/0288588 A1* | 10/2018 | Uchiyama | H04W 4/38 |
| 2018/0302768 A1* | 10/2018 | Uchiyama | G08G 1/166 |
| 2019/0045507 A1* | 2/2019 | Sorrentino | H04W 76/14 |
| 2019/0045521 A1* | 2/2019 | Hong | H04W 72/042 |
| 2019/0261214 A1* | 8/2019 | Kim | H04W 28/0278 |

OTHER PUBLICATIONS

Itri, "Potential enhancement for Uu-based V2V and Uu/PC5-basde [sic] V2I/N/P in mobility scenario", R1-157090, 3GPP TSG RAN WG1 Meeting #83, Anaheim, USA, Nov. 15-22, 2015, see section 2; and figures 1(b)-2.

Fujitsu, "Collision avoidance and Resource Pool Configuration for PC5 Based V2V", R1-160493, 3GPP TSG RAN WG1 Meeting #84, St Julian's, Malta, Feb. 15-19, 2016, see sections 2-3.

Samsung, "Collision avoidance mechanism for V2X", R1-156814, 3GPP TSG RAN WG1 Meeting #82, Anaheim, USA, Nov. 15-22, 2015, see sections 1-2.

Itri, "Potential enhancement for Uu-based V2V and Uu/PC5-basde V2I/N/P in mobility scenario", 3GPP TSG RAN WG1 Meeting #83, Nov. 15-22, 2015, R1-157090.

* cited by examiner

FIG. 6
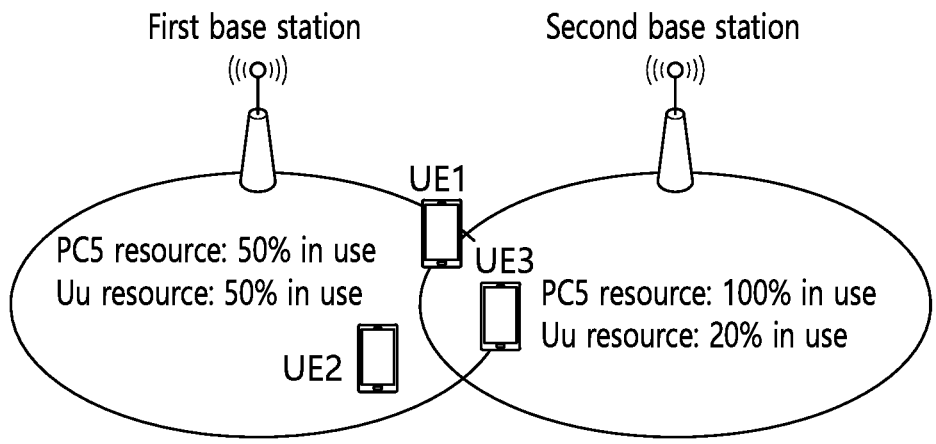
(a)
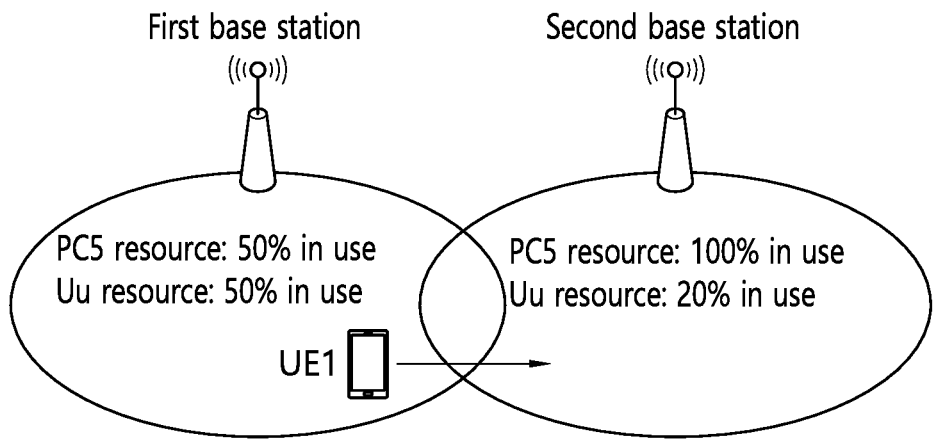
(b)

METHOD AND APPARATUS FOR PERFORMING V2X COMMUNICATION

CROSS-REFERENCE TO RELATED APPLICATIONS

This application is the National Stage filing under 35 U.S.C. 371 of International Application No. PCT/KR2017/001202, filed on Feb. 3, 2017, which claims the benefit of U.S. Provisional Application No. 62/292,242 filed on Feb. 6, 2016, the contents of which are all hereby incorporated by reference herein in their entirety.

BACKGROUND OF THE INVENTION

Field of the Invention

The present invention relates to a wireless communication system and, more particularly, to a method for performing V2X communication by a base station for supporting switching between a PC5 and a Uu in a wireless communication system and an apparatus for supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is based on a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, a D2D operation.

The D2D operation may be signal transmission/reception between adjacent devices to have various advantages. For example, a D2D UE may perform data communication with a high transmission rate and low delay. Further, the D2D operation may distribute traffic converged in a base station. If the D2D UE serves as a relay, the D2D UE may serve to extend coverage of a base station.

SUMMARY OF THE INVENTION

When a plurality of base stations supports both of a PC5-based V2V operation and a Uu-based V2V operation, occupancy rates of a PC5 resource or a Uu resource for transferring a V2X message on each base station may be different from each other. If the base station does not know the occupancy rate of a neighbor base station, the base station may assign a radio resource blocking V2X communication of a UE located at coverage of the neighbor base station to a UE located at coverage of the base station. If the base station does not know the occupancy rate of a neighbor base station, the base station may instruct the UE to perform handover using a PC5 resource or a Uu resource which cannot be assigned to the UE. Accordingly, a temporary failure may occur in V2X communication. Therefore, there is a need for a method of performing V2X communication by a base station.

According to an embodiment, a method for performing V2X communication by a base station in a wireless communication system is provided. The method includes receiving resource information used for V2X communication by a neighbor base station from the neighbor base station; and determining whether to perform one of PC5 handover or Uu handover for a user equipment (UE) on the basis of the resource information used for the V2X communication. Resource information used for V2X communication by a neighbor base station includes at least one of PC5 resource information or Uu resource information, which is used by the neighbor base station for the V2X communication, and the PC5 handover is performed using a PC5 resource of the neighbor base station, and the Uu handover is performed using a Uu resource of the neighbor base station.

The PC5 resource information may be the number of UEs using a PC5 resource in order to transmit the V2X message from the neighbor base station, and the Uu resource information may be the number of UEs using a Uu resource in order to transmit the V2X message from the neighbor base station.

The PC5 resource information may be a location of a PC5 resource used for V2X communication by the neighbor base station, and the Uu resource information may be a location of a Uu resource used for V2X communication by the neighbor base station.

The PC5 resource information may be a usage amount of a PC5 resource used for V2X communication in the neighbor base station, and the Uu resource information may include a usage amount of a Uu resource used for V2X communication in the neighbor base station.

The resource information may be a status of a load used for the V2X communication by the neighbor base station. The status of a load may be one of a low load status, an intermediate load state, or a high load state.

The resource information may be received by a Resource Status Reporting procedure or a Load Indication procedure.

Each of the base station and the neighbor base station may be a base station for supporting switching between a PC5-based V2X operation and a Uu-based V2X operation.

The UE may be a UE which moves to a coverage of the neighbor base station from a coverage of the base station.

The method may further include performing the determined handover for the UE to the neighbor base station.

According to another embodiment, a method for performing vehicle to everything (V2X) communication by a base station in a wireless communication system is provided. The method includes receiving information indicating whether a user equipment (UE) performing handover to the neighbor base station uses one of a PC5 resource or a Uu resource in coverage of the neighbor base station; and performing one of the PC5 handover or the Uu handover for the UE based on the received information, wherein the PC5 handover is performed using the PC5 resource of the neighbor base station, and the Uu handover is performed using the Uu resource of the neighbor base station.

The received information may be a PC5 related configuration of the neighbor base station used for the V2X or a Uu related configuration of the neighbor base station used for the V2X.

Each of the base station and the neighbor base station may be a base station for supporting switching between a PC5-based V2X operation and a Uu-based V2X operation.

According to another embodiment, a base station for performing vehicle to everything (V2X) communication is provided. The base station includes: a memory; a transceiver; and a processor connected to the memory and the transceiver, wherein the processor controls resource information used for V2X communication by a neighbor base station from the neighbor base station; and determines whether to perform one of PC5 handover or Uu handover for a user equipment (UE) on the basis of the resource information used for the V2X communication, wherein resource information used for V2X communication by a neighbor base station includes at least one of PC5 resource information or Uu resource information, which is used by the neighbor base station for the V2X communication, and the PC5 handover is performed using a PC5 resource of the neighbor base station, and the Uu handover is performed using a Uu resource of the neighbor base station.

A V2X message may be efficiently transmitted.

BRIEF DESCRIPTION OF THE DRAWINGS

FIG. 6 illustrates a problem occurring when a base station for supporting switching between a PC5 and a Uu for V2X communication.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
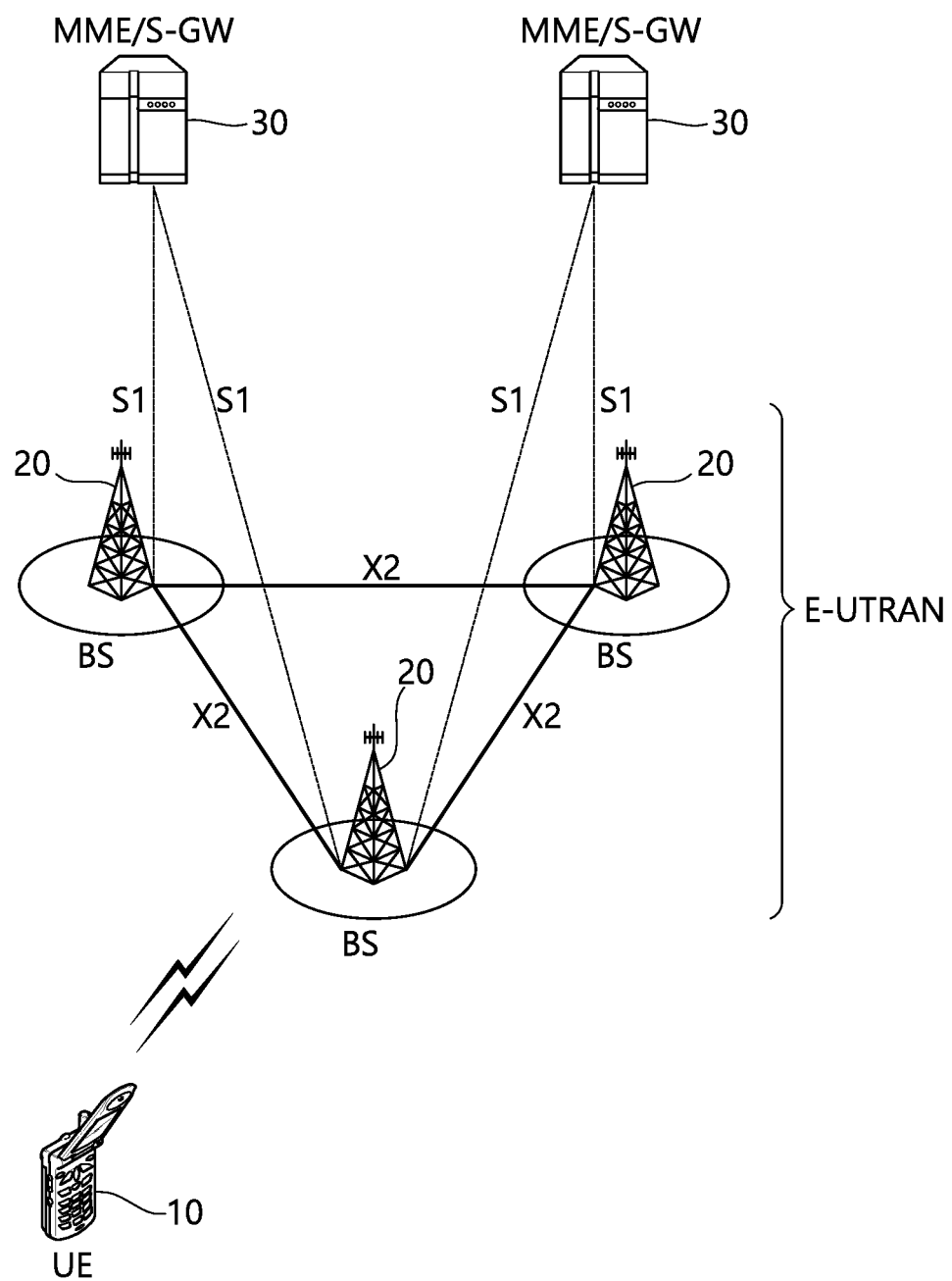
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighbor eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
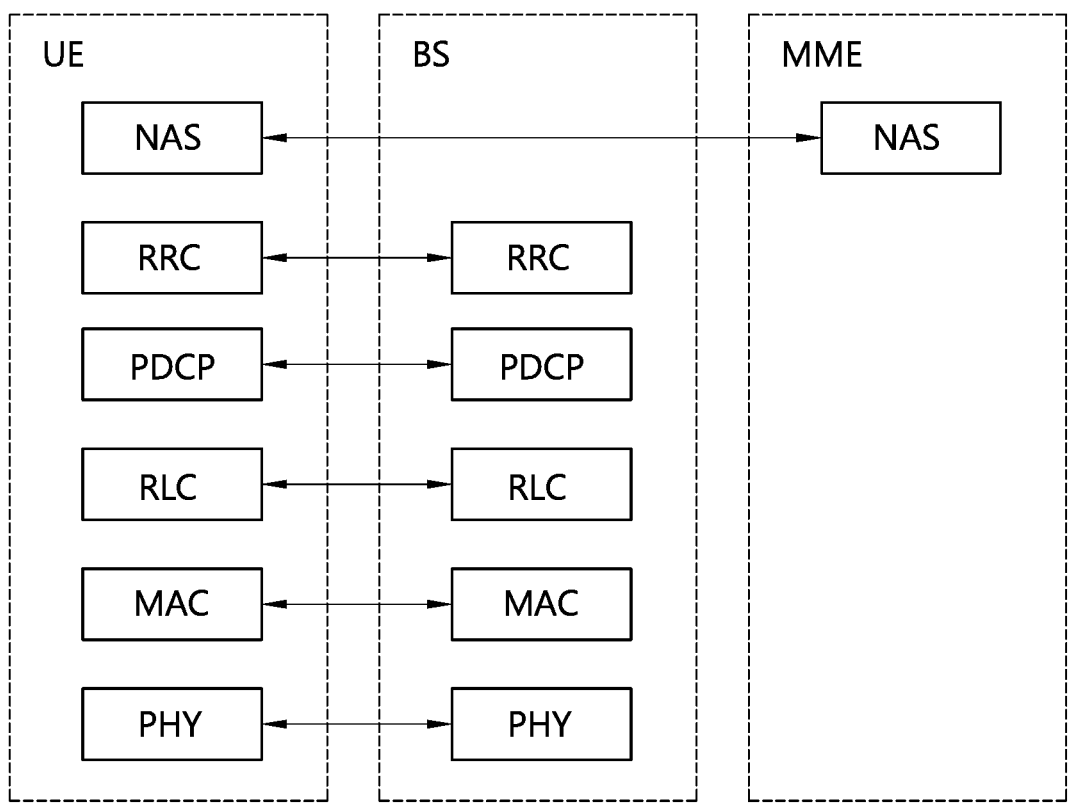
FIG. 2 shows a control plane of a radio interface protocol of an LTE system.
Figure 3:
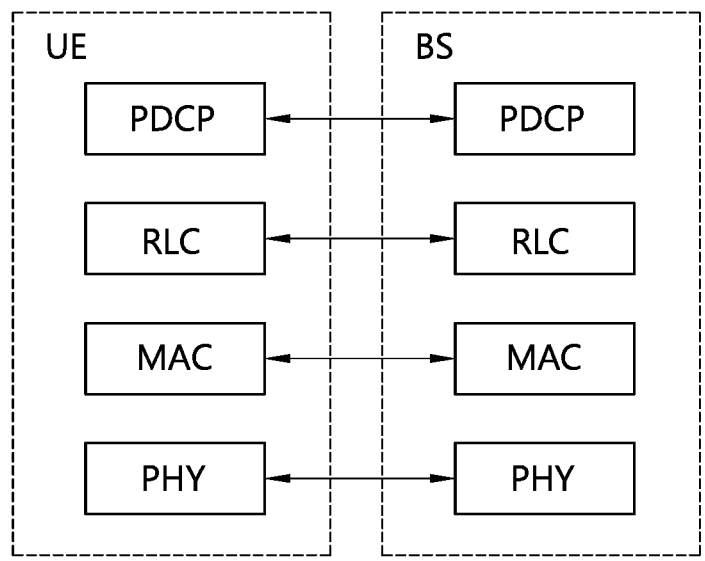
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel Data is transferred between the MAC layer and the PHY layer through the transport channel Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH). A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC State of a UE and RRC Connection Procedure are Described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighbor cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, a D2D Operation will be Described.

In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described. The ProSe includes ProSe direct communication and ProSe direct discovery.

The ProSe direct communication presents communication performed by two or more adjacent UEs. The UEs may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a UE which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable UEs are closed to each other, and reports the close state thereof the two ProSe enabled UEs. Hereinafter, the ProSe direct communication may refer to D2D communication, and the ProSe direct discovery may refer to D2D discovery.

Figure 4:
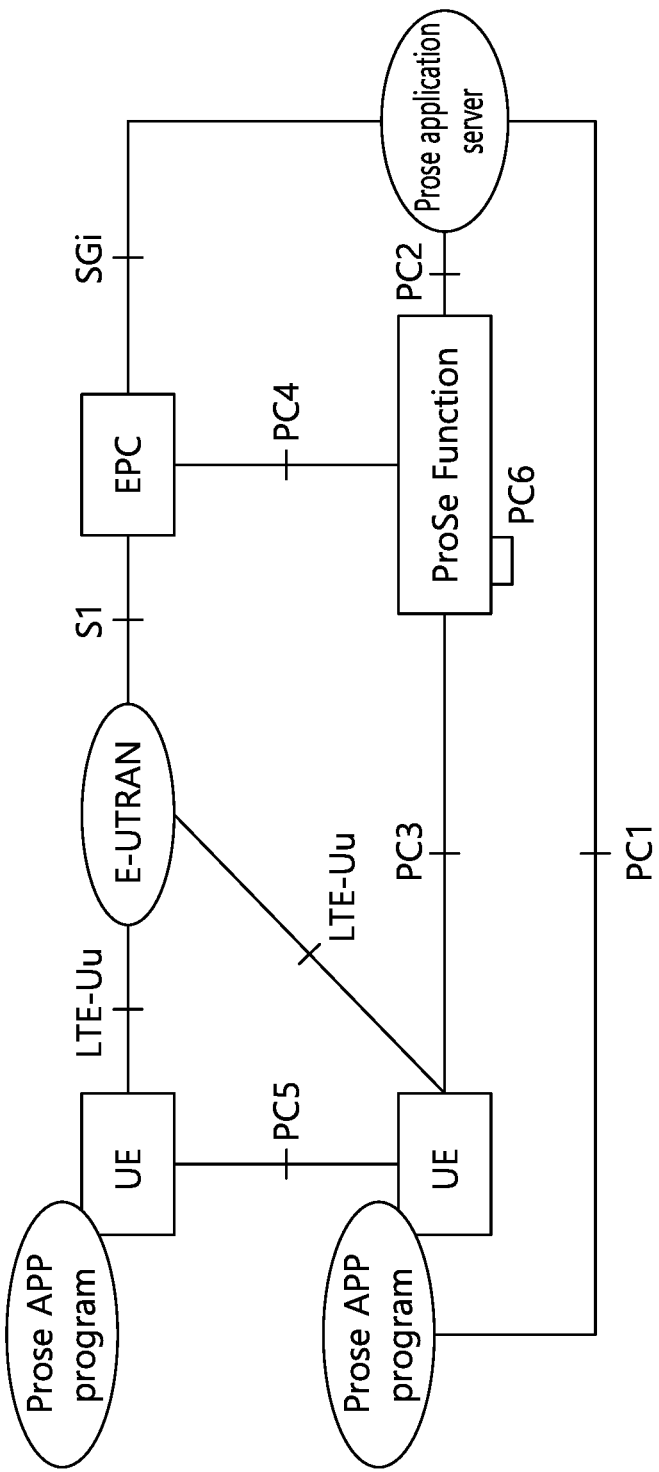
FIG. 4 shows a reference structure for a ProSe.

FIG. 4 shows a reference structure for a ProSe.

Referring to FIG. 4, the reference structure for a ProSe includes a plurality of UEs having E-UTRAN, EPC, and ProSe application program, a ProSe application (APP) server, and a ProSe function. An EPC is a representative example of the E-UTRAN. The EPC may include an MME, an S-GW, a P-GW, a policy and charging rules function (PCRF), and a home subscriber server (HSS). The ProSe application server is a user of ProSe in order to make an application function. The ProSe application server may communicate with an application program in the UE. The application program in the UE may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a Reference Point and a Reference Interface will be Described in a Reference Structure for the ProSe.

PC1: a reference point between a ProSe application program in the UE and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the UE and the ProSe function. The PC3 is used to define an interaction between the UE and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between UEs, and 1:1 communication.

PC6: is a reference point to use a function such as ProSe discovery between users included in different PLMNs.

SGi: may be used for application data and application level control information exchange.

Hereinafter, ProSe Direct Communication (D2D Communication) is described.

The ProSe direct communication is a communication mode where two public safety UEs may perform direct communication through a PC 5 interface. The communication mode may be supported in both of a case of receiving a service in coverage of E-UTRAN or a case of separating the coverage of E-UTRAN.

Hereinafter, Vehicle to Everything (V2X) Communication is Described.

Figure 5:
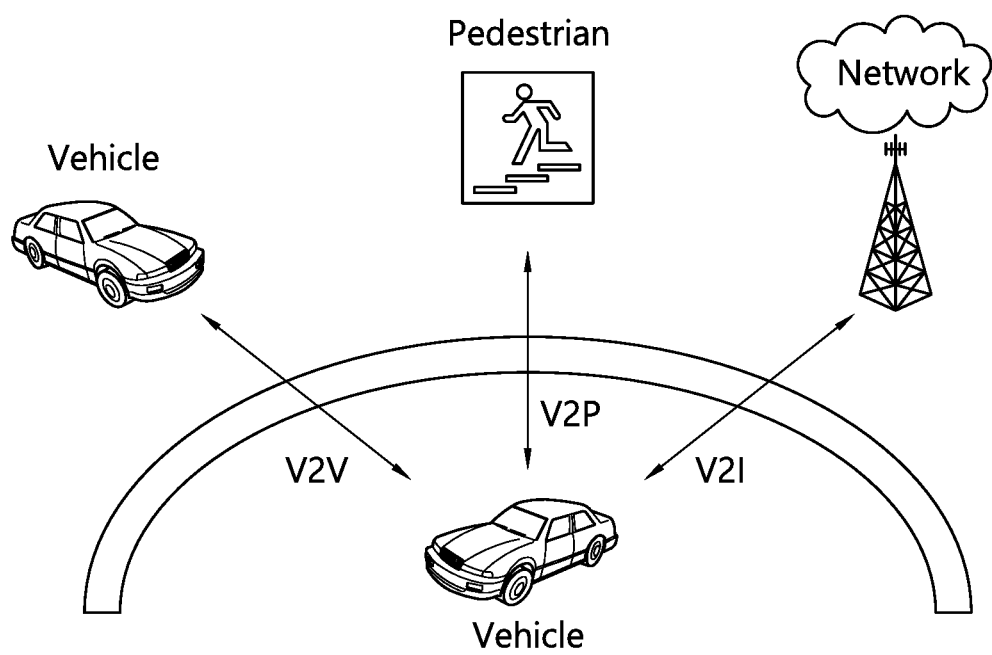
FIG. 5 is a diagram illustrating a V2X communication environment.

FIG. 5 is a diagram illustrating a V2X communication environment.

V2X is a technology that continuously communicates with a road infra or another vehicle while running a vehicle by adding mobility to D2D technology to exchange and share valuable information such as traffic situation. Researches and studies for supporting Vehicle-to-Vehicle (V2V) communication, Vehicle-to-Infrastructure (V2I) communication, Vehicle-to-Pedestrian (V2P) communication, Vehicle-to-Network (V2N) communication through evolution of connectivity function has been performed.

According to V2X communication, a vehicle continuously broadcasts a position, speed, and a direction of the vehicle. Peripheral vehicles receiving the broadcasted information recognize movement of peripheral vehicles to use accident prevention. That is, similar to a case where a person has a UE in the form of a smart phone or a smart watch, a UE of a specific form may be installed in each vehicle. In this case, a UE installed at a vehicle is a device for receiving a real communication service from a communication network. For example, the UE installed at the vehicle may access a base station in an E-UTRAN to receive a communication service.

Meanwhile, before describing a suggested V2X, a plurality of terms to be used in the specification is firstly defined.

RSU (Road Side Unit): The RSU is an entity for supporting V2I communication, and means an entity capable of performing transmission and reception to and from a UE using a V2I application. The RSU may be configured by a base station or a UE (particularly, stationary UE). The base station or the UE operating as the RSU collects information (e.g., traffic light information, traffic volume information, and the like) on traffic safety and/or information on movement of peripheral vehicles, and transmits information to other UEs being a communication target or receives information from other UEs.

V2I communication: V2I communication is a type of V2X communication. A UE and an RSU using the V2I application becomes a subject of the V2I communication.

V2N communication: V2N communication is a type of V2X communication. A UE and a serving entity using a V2N application becomes a subject of the V2N communication, and the UE and the serving entity communicate with each other through an LTE network entity.

V2P communication: V2P communication is a type of V2X communication. Two UE using a V2P application become a subject of the V2P communication.

V2V communication: V2V communication is a type of V2X communication. Two UE using a V2V application become a subject of the V2V communication. The difference of V2V communication from V2P communication is in that one UE becomes a UE of a pedestrian in the V2P communication, and one UE becomes a UE of a vehicle in the V2V communication.

Un interface: The Un interface means an interface between a relay node and a base station, which is an interface used in transmission/reception achieved in MBSFN (MBMS (Multimedia Broadcast/Multicast Services) over Single Frequency Network) subframe.

PC5 interface: The PC5 interface means an interface used in direct communication between two UEs, which is an interface used for communication between devices for supporting a Proximity Service (ProSE).

In a case of V2V communication, a V2V message may be transmitted using a PC5 resource or a Uu resource. In the present specification, the V2V message transmitted using the PC5 are the same as a V2V message transmitted through a PC5 interface. A V2V message transmitted using the Uu resource is the same as a V2V message transmitted through a Uu interface. In the present specification, it is assume that the base station support switching between the PC5 and the Uu for V2V communication. That is, the base station may use the PC5 resource or the Uu resource for V2V communication. When a plurality of base stations supports both of a PC5-based V2V operation and a Uu-based V2V operation, occupancy rates of a PC5 resource or a Uu resource for transferring a V2X message on each base station may be different from each other. In other words, according to a radio resource condition of each current base station, a partial base station may select the PC5 resource rather than the Uu resource, and another base station may select the Uu resource rather than the PC5 resource.

FIG. 6 illustrates a problem occurring when a base station for supporting switching between a PC5 and a Uu for V2X communication. In detail, FIG. 6(a) illustrates a problem occurring when a base station for supporting switching between a PC5 and a Uu handles a UE located at a coverage edge. FIG. 6(b) illustrates a problem occurring when handover is performed between a plurality of base stations for supporting switching between the PC5 and the Uu.

Referring to FIG. 6(a), it is assumed that a first base station and a second base station are adjacent to each other.

It is assumed that with respect to transmission of the V2V message, a first base station is using 50% of the PC5 resource and 50% of the Uu resource, and a second base station is using 100% of the PC5 resource and 20% of the Uu resource. That is, the second base station may use no PC5 resource longer. It is assumed that UE 1 and UE 3 are in RRC_CONNECTED state, and use the PC5 resource in order to transmit the V2V message. Further, UE 1 and UE 2 are located at a coverage of a first base station to be close to a coverage of the second base station, and UE 3 is located at a coverage of the second base station to be close to the first station. Under the above assumption, if the first base station does not know an occupancy rate of a PC5 resource with respect to the second base station, the first base station may assign a radio resource blocking transmission of a V2V message by the UE 3 to the UE 1 and the UE 2. Accordingly, although the UE 3 transmits a V2V message on a radio resource assigned by the second base station, UEs located at a communication range of the UE 3 may not receive the V2V message.

Referring to FIG. 6(*b*), it is assumed that a first base station and a second base station are adjacent to each other. It is assumed that with respect to transmission of the V2V message, a first base station is using 50% of the PC5 resource and 50% of the Uu resource, and a second base station is using 100% of the PC5 resource and 20% of the Uu resource. That is, the second base station may use no PC5 resource longer. It is assumed that UE 1 is in a RRC_CONNECTED state, and uses the PC5 resource in order to transmit the V2V message. Under the above assumption, a first base station which does not know an occupancy rate of a PC5 resource of the second base station determines handover of UE 1, the first base station may transmit information on a PC5 of the UE 1 including a Handover Request message to the second base station. However, since there is no PC5 resource capable of being assigned by the base station longer, Handover failure (HOF) may occur. Accordingly, although the UE 1 includes a V2V message to be transmitted, the UE 1 performs switching between the PC5 and the Uu. Next, until the UE 1 acquires the Uu resource from the second base station, the UE 1 may not transmit the V2V message.

Since the base station does not know PC5 resource information and/or Uu resource information of a neighbor base station, the above problem may occur. Accordingly, there is a need to newly suggest a method for performing V2V communication by a base station. For convenience of the description, although V2V communication was described as an example, a technical idea is not limited to V2V communication. Hereinafter, the technical idea of the present invention is similarly applicable to various V2X communications such as V2I, V2P or V2N communication. Hereinafter, a method for performing V2V communication by a base station and an apparatus for supporting the same according to an embodiment of the present invention is described in detail.

Figure 7:
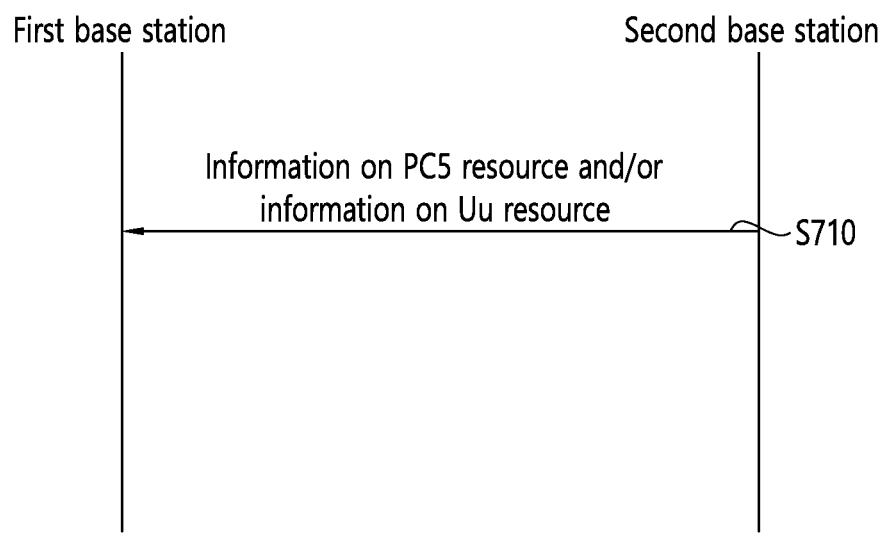
FIG. 7 illustrates a method of receiving resource information used for V2X communication by a neighbor base station from the neighbor base station by a base station according to an embodiment of the present invention.

FIG. 7 illustrates a method of receiving resource information used for V2X communication in a neighbor base station from the neighbor base station by a base station according to an embodiment of the present invention.

Referring to FIG. 7, at step S710, a first base station may receive information on a PC5 resource and/or information on the Uu resource from the second base station. The first base station may be a serving base station, and the second base station may be a target base station. The information on a PC5 resource may be information on a PC5 resource which is current used for V2V communication in a coverage of the second base station. The information on the Uu resource may be information on the Uu resource which is current used for V2V communication in coverage of the second base station. The information on a PC5 resource and/or the information on the Uu resource may be transferred by a Resource Status Reporting procedure or a Load Indication procedure.

The information on a PC5 resource and/or the information on the Uu resource may include at least one of following information.

1) The number of UEs using the PC5 resource to transmit the V2V message from a second base station and/or the number of UEs using the number of UEs using the PC5 resource to transmit the V2V message from a second base station resource to transmit the V2V message from a second base station 2) a status of a PC5 resource in the second base station and/or a status of a Uu resource in the second base station 2-1) Location of a PC5 resource now used in a resource pool of the second base station and/or location of a Uu resource now used in a resource pool of the second base station 2-2) Status of load (e.g., low load, intermediate load, or high load) in the second base station.

3) Usage amount of the PC5 resource in the second base station and/or usage amount of Uu resource in the second base station (e.g., integer from 0 to 100)

In a scenario illustrated in FIG. 6(*a*), after information on the PC5 resource and/or information on the Uu resource are received from the second base station, the first base station may assign a PC5 resource for transmitting a V2V message or an Uu resource for transmitting a V2V message with respect to a specific UE based on the received information. The specific UE may be a UE which is located at a coverage boundary of the first base station and at a location close to coverage of the second base station. The PC5 resource or the Uu resource may be assigned to prevent interference with UE located at the second base station by taking into the information on the PC5 resource and/or the information on the Uu resource of the second base station. For example, if the second base station uses the Uu resource more than the PC5 resource in order to transmit a V2V message, the first base station may assign a PC5 resource with respect to the specific UE. Conversely, if the second base station uses the Uu resource less than the PC5 resource in order to transmit a V2V message, the first base station may assign the Uu resource with respect to the specific UE.

In a scenario illustrated in FIG. 6(*b*), after information on the PC5 resource and/or information on the Uu resource are received from the second base station, the first base station may perform PC5 handover or Uu handover with respect to a specific UE based on the received information. The specific UE may include a UE currently served by the first base station and a UE to handover to the second base station. The PC5 handover may mean handover to be performed using a PC5 resource of the second base station by the first base station. The Uu handover may mean handover to be performed using a Uu resource of the second base station by the first base station. For example, the first base station compares a PC5 resource used by the second base station with a PC5 resource threshold value. If the used PC5 resource is less than the PC5 resource threshold value, the first base station may perform PC5 handover. For example, the first base station compares a Uu resource used by the second base station with a Uu resource threshold value. If the used Uu resource is less than the Uu resource threshold value, the first base station may perform PCS handover. For example, the first base station compares the PC5 resource used from the second base station with the Uu resource used from the second base station. The first base station may perform handover using a less used resource.

Figure 8:
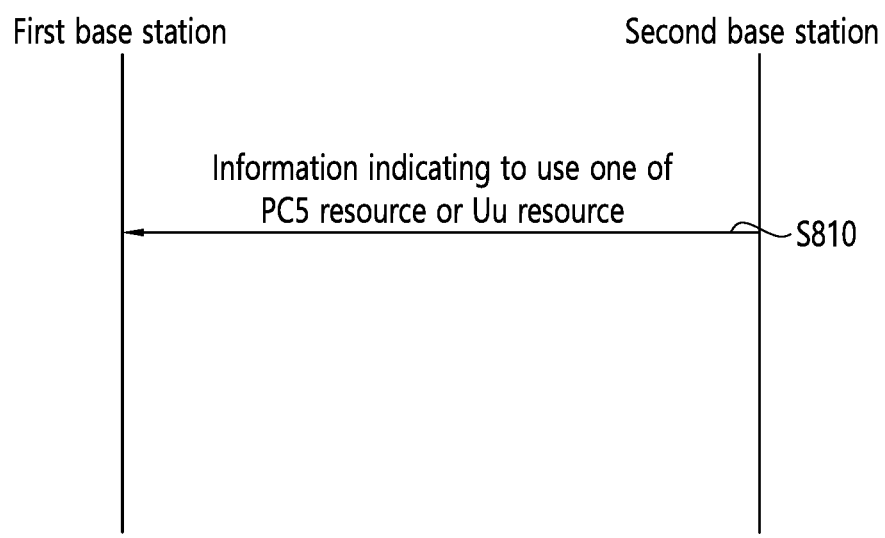
FIG. 8 illustrates a method of receiving resource information to be used for V2X communication by a neighbor base station from the neighbor base station by a base station according to an embodiment of the present invention.

FIG. 8 illustrates a method of receiving resource information to be used for V2X communication in a neighbor base station from the neighbor base station by a base station according to an embodiment of the present invention.

Referring to FIG. 8, at step S810, the first base station may receive information indicating whether a specific UE performing handover to the second base station uses a PC5 resource or a Uu resource in coverage in the second base station from the second base station. The specific UE may be a UE currently served by the first base station, and a UE to handover to the second base station. Information provided from the second base station may be a PC5 related configuration of the second base station to be used for the V2V communication or a Uu related configuration to be used for the V2V communication. The second base station may use a RRC container included in a handover request acknowledgement message in order to transfer the above information to the first base station.

After receiving the above information from the second base station, the first base station may perform PC5 handover or Uu handover with respect to the specific UE based on the received information.

Figure 9:
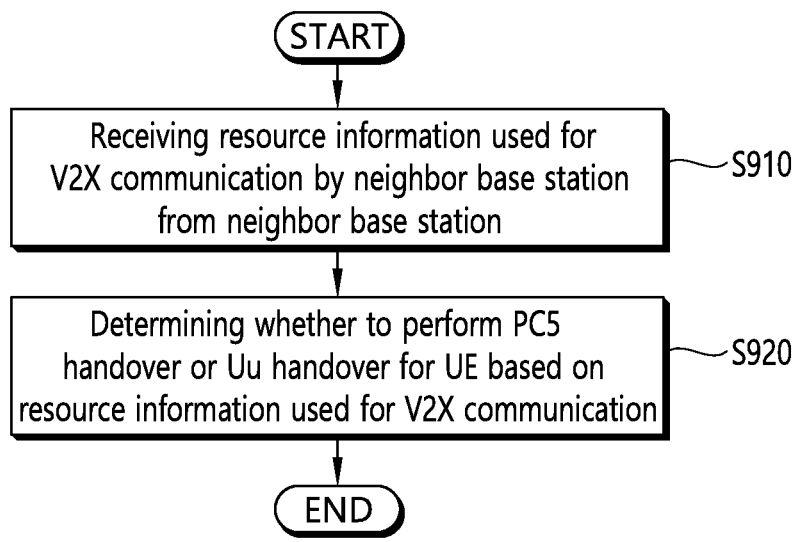
FIG. 9 is a block diagram illustrating a method for performing V2X communication by a base station according to an embodiment of the present invention.

FIG. 9 is a block diagram illustrating a method for performing V2X communication by a base station according to an embodiment of the present invention.

Referring to FIG. 9, at step S910, the base station may receive resource information used for V2X communication by a neighbor base station. The resource information used for V2X communication by a neighbor base station may include at least one of PC5 resource information or Uu resource information to be used for V2X communication by a neighbor base station.

The PC5 resource information may be the number of UEs using a PC5 resource to transmit the V2X message by the neighbor base station. The Uu resource information may be the number of UEs using a Uu resource to transmit the V2X message by the neighbor base station.

The PC5 resource information may be a location of a PC5 resource used for V2X communication by the neighbor base station. The Uu resource information may be a location of a Uu resource used for V2X communication by the neighbor base station.

The PC5 resource information may be a usage amount of a PC5 resource used for V2X communication by the neighbor base station. The Uu resource information may be a usage amount of a Uu resource used for V2X communication by the neighbor base station.

The resource information may be a status of a load used for the V2X communication by the neighbor base station. The status of a load may be one of a low load status, an intermediate load state, or a high load state.

The resource information may be received by a Resource Status Reporting procedure or a Load Indication procedure.

At step S920, a base station may determine whether to perform one of PC5 handover or Uu handover for the UE based on the resource information used for the V2X communication. The PC5 handover may be handover performed using a PC5 resource of the neighbor base station. The Uu handover may be handover performed using a Uu resource of the neighbor base station.

The base station and the neighbor base station may be a base station for supporting switching between a PC5-based V2X operation and a Uu-based V2X operation.

The UE may be a UE which moves to a coverage of the neighbor base station from a coverage of the base station.

Next, the base station may perform the handover determined by the neighbor base station with the UE. The PC5 handover may be performed using a PCS resource of the neighbor base station, and the Uu handover may be performed using a Uu resource of the neighbor base station.

Figure 10:
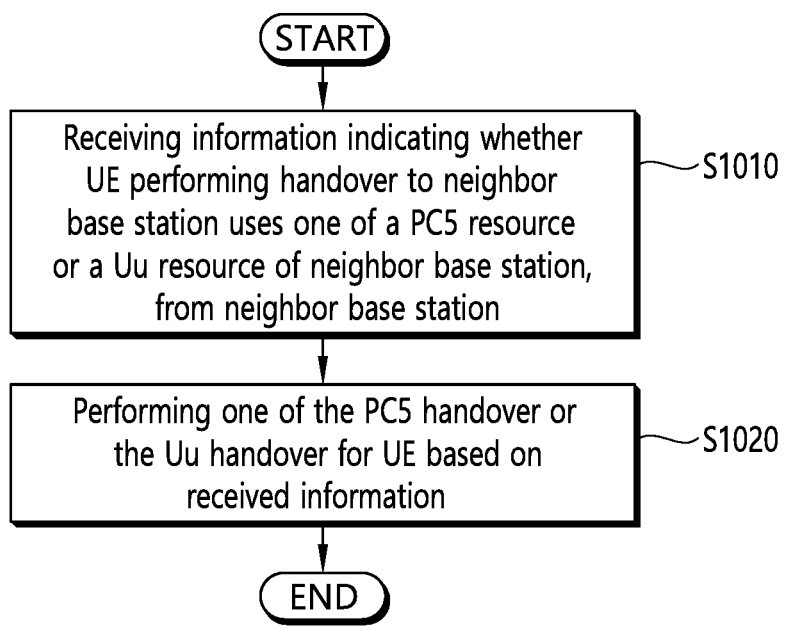
FIG. 10 is a block diagram illustrating a method for performing V2X communication by a base station according to an embodiment of the present invention.

FIG. 10 is a block diagram illustrating a method for performing V2X communication by a base station according to an embodiment of the present invention.

Referring to FIG. 10, at step S1010, a base station may receive information indicating whether a UE performing handover to the neighbor base station uses one of a PC5 resource or a Uu resource in coverage of the neighbor base station. The received information may include PC5 related configuration of the neighbor base station to be used for the V2X communication or a Uu related configuration of the neighbor base station to be used for the V2X communication.

At step S1020, the base station may perform one of the PC5 handover or the Uu handover for the UE based on the received information. The PC5 handover may be performed using a PC5 resource of the neighbor base station, and the Uu handover may be performed using the Uu resource of the neighbor base station.

Figure 11:
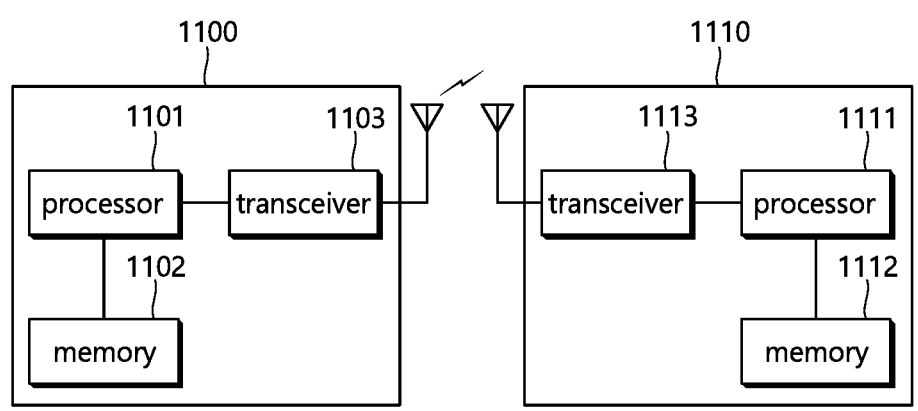
FIG. 11 is a block diagram illustrating a wireless communication system according to the embodiment of the present invention.

FIG. 11 is a block diagram illustrating a wireless communication system according to the embodiment of the present invention.

A BS 1100 includes a processor 1101, a memory 1102 and a transceiver 1103. The memory 1102 is connected to the processor 1101, and stores various information for driving the processor 1101. The transceiver 1103 is connected to the processor 1101, and transmits and/or receives radio signals. The processor 1101 implements proposed functions, processes and/or methods. In the above embodiment, an operation of the base station may be implemented by the processor 1101.

A UE 1110 includes a processor 1111, a memory 1112 and a transceiver 1113. The memory 1112 is connected to the processor 1111, and stores various information for driving the processor 1111. The transceiver 1113 is connected to the processor 1111, and transmits and/or receives radio signals. The processor 1111 implements proposed functions, processes and/or methods. In the above embodiment, an operation of the UE may be implemented by the processor 1111.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method performed by a base station (BS) in a wireless communication system, the method comprising:
   allocating, to a user equipment (UE), a PC5 resource to perform vehicle to everything (V2X) communication;
   receiving, from a neighbor BS, by a Resource Status Reporting procedure or a Load Indication procedure, resource information used for the V2X communication by the neighbor BS, wherein the resource information includes an occupancy rate of the PC5 resource and an occupancy rate of a Uu resource used by the neighbor BS for the V2X communication; and
   performing a Uu handover to the neighbor BS for the UE, which moves to the neighbor BS from the BS, based on the received resource information used for the V2X communication,
   wherein the Uu handover is performed using a Uu resource of the neighbor BS, and
   wherein each of the BS and the neighbor BS is a BS for supporting switching between a PC5-based V2X operation and a Uu-based V2X operation.

2. The method of claim 1, wherein the resource information includes at least one of a number of UEs using the PC5 resource to transmit the V2X message from the neighbor BS or a number of UEs using the Uu resource to transmit the V2X message from the neighbor BS.

3. The method of claim 1, wherein the resource information includes at least one of a location of the PC5 resource used for the V2X communication by the neighbor BS or a location of the Uu resource used for the V2X communication by the neighbor BS.

4. The method of claim 1, wherein the resource information includes at least one of a usage amount of the PC5 resource used for the V2X communication by the neighbor BS or a usage amount of the Uu resource used for the V2X communication by the neighbor BS.

5. The method of claim 1, wherein the resource information includes a status of a load used for the V2X communication by the neighbor BS.

6. The method of claim 5, wherein the status of a load is one of a low load status, an intermediate load state, or a high load state.

7. A method performed by a base station (BS) in a wireless communication system, the method comprising:
   allocating, to a user equipment (UE), a Uu resource to perform vehicle to everything (V2X) communication;
   receiving, from a neighbor BS, by a Resource Status Reporting procedure or a Load Indication procedure, resource information used for the V2X communication by the neighbor BS, wherein the resource information includes an occupancy rate of the PC5 resource and an occupancy rate of the Uu resource used by the neighbor BS for the V2X communication;
   performing a PC5 handover to the neighbor BS for the UE, which moves to the neighbor BS from the BS, based on the resource information used for the V2X communication; and
   wherein the PC5 handover is performed using a PC5 resource of the neighbor BS, and
   wherein each of the base station and the neighbor base station is a base station for supporting switching between a PC5-based V2X operation and a Uu-based V2X operation.

* * * * *